(12) United States Patent
Takura

(10) Patent No.: US 6,323,574 B1
(45) Date of Patent: Nov. 27, 2001

(54) POLYPHASE MOTOR AND POLYPHASE MOTOR SYSTEM FOR DRIVING THE SAME

(75) Inventor: Toshiyasu Takura, Hino (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,411

(22) Filed: Sep. 21, 1999

(30) Foreign Application Priority Data

Sep. 29, 1998 (JP) ................................................. 10-275961

(51) Int. Cl.$^7$ ............................. H02K 1/00; H02K 37/00
(52) U.S. Cl. ........................ 310/179; 310/184; 310/49 R
(58) Field of Search .................... 310/179, 180, 310/186, 198, 203, 206, 207, 49 R, 156

(56) References Cited

U.S. PATENT DOCUMENTS

| | | | | |
|---|---|---|---|---|
| 3,385,984 | * | 5/1968 | O'Regan ................................. | 310/184 |
| 3,588,888 | * | 6/1971 | Harden ................................. | 310/49 R |
| 3,705,343 | * | 12/1972 | Ringland et al. ...................... | 323/48 |
| 3,984,711 | * | 10/1976 | Kordik ................................. | 310/49 R |
| 4,081,703 | * | 3/1978 | Madsen et al. ....................... | 310/49 R |
| 4,733,113 | * | 3/1988 | Smith ................................. | 310/49 R |
| 4,752,707 | * | 6/1988 | Morrill ................................. | 310/184 |
| 5,006,745 | * | 4/1991 | Hishio et al. ......................... | 310/177 |
| 5,164,622 | * | 11/1992 | Kordik ................................. | 310/67 R |
| 5,675,196 | * | 10/1997 | Huang et al. ........................ | 310/67 R |
| 5,693,989 | * | 12/1997 | Satomi et al. ....................... | 310/12 |
| 5,763,976 | * | 6/1998 | Huard ................................. | 310/168 |
| 6,034,460 | * | 3/2000 | Tajima et al. ........................ | 310/179 |
| 6,051,898 | * | 4/2000 | Sakamoto ............................ | 310/184 |

FOREIGN PATENT DOCUMENTS

| | | |
|---|---|---|
| 63-316688 | 12/1988 | (JP) . |
| 3-32387 | 2/1991 | (JP) . |

* cited by examiner

*Primary Examiner*—Nestor Ramirez
*Assistant Examiner*—Dang Dinh Le
(74) *Attorney, Agent, or Firm*—Frishauf, Holtz, Goodman, Langer & Chick, P.C.

(57) ABSTRACT

A polyphase motor apparatus comprises a rotor having a rotating shaft and a plurality of permanent magnets connected therearound, a stator for holding the rotor rotatably and provided so as to surround the rotor, having n phases (n is an integer which is three or more) and n×m (m is an integer which is one or more) magnetic poles, in which each of n pairs of the magnetic poles adjacent to each other is wound with a core wire an end of which is connected to a common terminal (+E), such that one magnetic pole is a first magnetic polarity and the other magnetic pole is a second magnetic polarity different from the first magnetic polarity, and the n-phase voltage from outside is applied between the common terminal and the other end of the core wire of each pair so as to generate a magnetic field for rotating the rotor.

5 Claims, 9 Drawing Sheets

|         | 1   | 2   | 3   |
|---------|-----|-----|-----|
| A PHASE | ON  | OFF | OFF |
| B PHASE | OFF | ON  | OFF |
| C PHASE | OFF | OFF | ON  |

FIG. 15

|         | 1   | 2   | 3   | 4   | 5   | 6   |
|---------|-----|-----|-----|-----|-----|-----|
| A PHASE | ON  | ON  | ON  | OFF | OFF | OFF |
| B PHASE | OFF | OFF | ON  | ON  | ON  | OFF |
| C PHASE | ON  | OFF | OFF | OFF | ON  | ON  |

FIG. 16

|         | 1   | 2   | 3   | 4   | 5   | 6   | 7   | 8   |
|---------|-----|-----|-----|-----|-----|-----|-----|-----|
| A PHASE | ON  | ON  | OFF | OFF | OFF | OFF | OFF | ON  |
| B PHASE | OFF | ON  | ON  | ON  | OFF | OFF | OFF | OFF |
| C PHASE | OFF | OFF | OFF | ON  | ON  | ON  | OFF | OFF |
| D PHASE | OFF | OFF | OFF | OFF | OFF | ON  | ON  | ON  |

FIG. 17

POLYPHASE MOTOR AND POLYPHASE MOTOR SYSTEM FOR DRIVING THE SAME

BACKGROUND OF THE INVENTION

The present invention relates to a polyphase motor such as a three-phase motor having a stator having six magnetic poles and four magnetic poles each composed of permanent magnet, and a four-phase motor having a stator having eight magnetic poles and four magnetic poles each composed of permanent magnet.

In a conventional three-phase motor (not shown) which is operated at an arbitrary speed and output, a rotor containing permanent magnets in the circumferential direction is fixed and disposed inside a stator having six magnetic poles, and by changing the exciting magnetic polarity of each magnetic pole of phases A, B, C of the stator, the rotor is rotated.

The three-phase motor having such a structure is controlled by a driving unit. That is, a first transistor series circuit, a second transistor series circuit and a third transistor series circuit are connected between +E terminal and grounding. A core wire of each phase is connected to a first joint of the transistor, a second joint point of the transistor, and a third joint of the transistor.

On the other hand, a micro computer is provided so as to input a speed instruction pulse for controlling the rotation speed to an AND gate and a rotation position of the three-phase motor is detected by a position detecting signal generating circuit provided with hall devices each time when the rotor is rotated by 30°. The position detection signal is inputted to the AND gate circuit via a delay circuit. The delay circuit adjusts a timing for supplying the position detection signal to the AND gate circuit by controlling the delay of the position detection signal. An interval of the delay is controlled by the micro computer depending on load and acceleration of the motor.

The AND gate circuit obtains the logical product of a speed instruction pulse from the micro computer and a position detection signal from the delay circuit and its logical product output is outputted to a six-step ring counter. This ring counter changes an output to six output lines in succession depending on input of the logical product output from the AND gate circuit and repeats this procedure to supply the output to an invertor IC. The invertor IC fetches an output from the ring counter and controls switching of the respective transistors so that the three-phase motor is operated in step order for phase excitation or in inverse step order.

In this conventional three-phase motor, a voltage between respective lead wires Y or Δ connected of three-phase windings for phases A, B, C is changed over between normal direction and inverse direction by switching operation of six transistors so as to drive the rotor 3. Therefore, switching frequency per a rotation is as large as six, and the fact that the switching frequency is large is an obstacle for high-speed driving of the motor. That is, to prevent a shortcircuit of a transistor bridge composed of transistors, a high side transistor needs to be actuated after a low side transistor is completely interrupted, and a waiting time is thus required. Therefore, an expensive power transistor having a high switching speed needs to be chosen as a transistor so as to achieve high-speed driving.

As described above, conventionally, to achieve high-speed driving, a number of expensive power transistors having a high switching speed have to be used, and therefore, there are disadvantages in that a space of a circuit portion and the production cost increase.

BRIEF SUMMARY OF THE INVENTION

Accordingly, it is an object of the present invention to provide a polyphase motor capable of reducing the number of switching devices used for controlling power supply to each winding thereby making it possible to reduce a space for a circuit portion of a driving unit and the production cost thereof.

To achieve the above object, according to an aspect of the present invention, there is provided a polyphase motor apparatus comprising: a rotor having a rotating shaft and a plurality of permanent magnets connected therearound; a stator for holding the rotor rotatably and provided so as to surround the rotor, having n phases (n is an integer which is three or more) and n×m (m is an integer which is one or more) magnetic poles, in which each of n pairs of the magnetic poles adjacent to each other is wound with a core wire an end of which is connected to a common terminal (+E), such that one magnetic pole is a first magnetic polarity and the other magnetic pole is a second magnetic polarity different from the first magnetic polarity, and an n-phase voltage from outside is applied between the common terminal and the other end of the core wire of each pair so as to generate a magnetic field for rotating the rotor.

With such a structure, when a current flows through a core wire of a magnetic pole of a single phase, a magnetic field by S pole and N pole is generated, so that a "state in which different magnetic fields are generated in parallel" necessary for rotating the rotor with a single current is produced. Thus, as current for rotating the rotor, currents in the normal direction and inverse direction are not required for each phase, but by providing a single direction current for each phase appropriately, a necessary magnetic field is obtained. Therefore, although in a conventional apparatus, a driving unit for three phases for example requires current control with six transistors, according to the present invention, a necessary rotation is obtained by supplying a current under current control with three transistors because the present invention provides a single direction current. Therefore, the space of the driving unit can be largely reduced and the control method can be simplified.

According to a preferred embodiment of the present invention, the stator is a stator for holding the rotor rotatably and provided so as to surround therearound, having n phases (n is an integer which is three or more) and n×m (m is an integer which is one or more) magnetic poles and each of n pairs of the magnetic poles adjacent to each other is wound with a core wire an end of which is connected to the common terminal (+E) such that one magnetic pole is a first magnetic polarity and the other is a second magnetic polarity different from the first magnetic polarity, the core wire wound around both the magnetic poles being in parallel, and an n-phase voltage from outside is applied between the common terminal and the other end of the core wire of each pair so as to generate a magnetic field for rotating the rotor.

Thus, a correspondence to driving with a low voltage power supply is facilitated. Although at an adjacent magnetic pole, rise of excitation is delayed due to an influence of residual magnetic flux of a phase previously excited, at the other magnetic pole, excitation is started at the same time when an electric power is supplied, so that the delay of excitation of both adjacent magnetic poles is eliminated more than a case of series connection. Thus, a response to an instruction speed can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a diagram showing ON/OFF of each phase for actuating the three-phase motor;

FIG. 16 is a diagram showing ON/OFF of each phase for actuating the three-phase motor more in detail; and FIG. 17 is a diagram showing ON/OFF of each phase for actuating a four-phase motor.

DETAILED DESCRIPTION OF THE INVENTION

The embodiment of the present invention will be described with reference to the accompanying drawings.
(First Embodiment)

A polyphase motor so constructed that adjacent magnetic poles have different polarities from each other according to the first embodiment will be described. Here, a three-phase motor will be described as the polyphase motor.

Figures 1, 2:
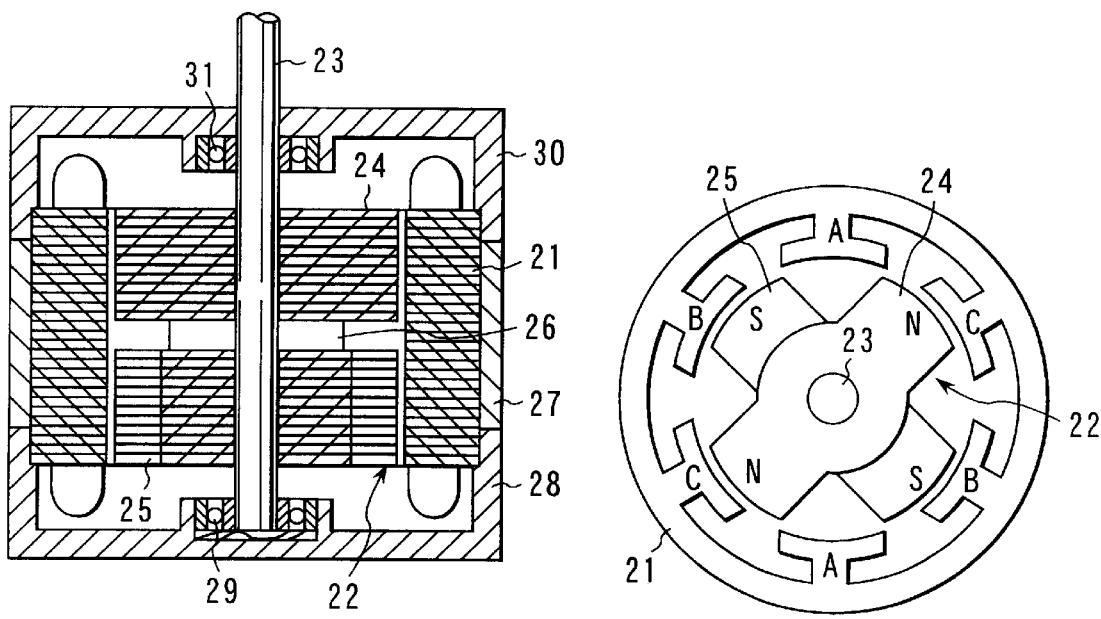
FIG. 1 is a longitudinal sectional view of an entire 3-phase motor according to a first embodiment of the present invention.
FIG. 2 is a plan view showing a relationship between a rotor magnetic pole and stator exciting phase.

FIG. 1 is a longitudinal sectional view of an entire three-phase motor and FIG. 2 is a plan view showing a relationship between rotor magnetic poles and stator exciting phases. Six magnetic poles are spaced at a mechanical angle of 60° and concentrated bifilar winding is performed on each pole, so that a stator 21 having a symmetrical structure by 180° is provided, in which phases A, B, C, A, B, C are formed in counter-clockwise direction. Then, a convex pole rotor 22 having four poles is fixed on a rotating shaft 23 and disposed rotatably in the stator 21.

This convex-pole rotor 22 is formed integrally with the rotating shaft 23 by overlaying a pair of I-shaped lamination cores 24, 25 via a permanent magnet 26 made of rare earth metal such as a circular samarium cobalt magnet, which is magnetized in an axial direction in a cross-shaped form. The upper I-shaped core 24 forms N pole and the lower I-shaped core 25 forms S pole.

This stator 21 is accommodated and fixed in a cylindrical central casing 27 and the aforementioned convex-pole rotor 22 is accommodated in the stator 21. An end of the rotating shaft 23 is supported rotatably by a bearing 29 mounted in the center of a concave end portion casing 28 mounted at an end of the central casing 27. The other end thereof passes through a bearing 31 mounted in the center of a concave end portion casing 30 mounted on the other end of the central casing 27 such that it is supported rotatably.

Figure 3:
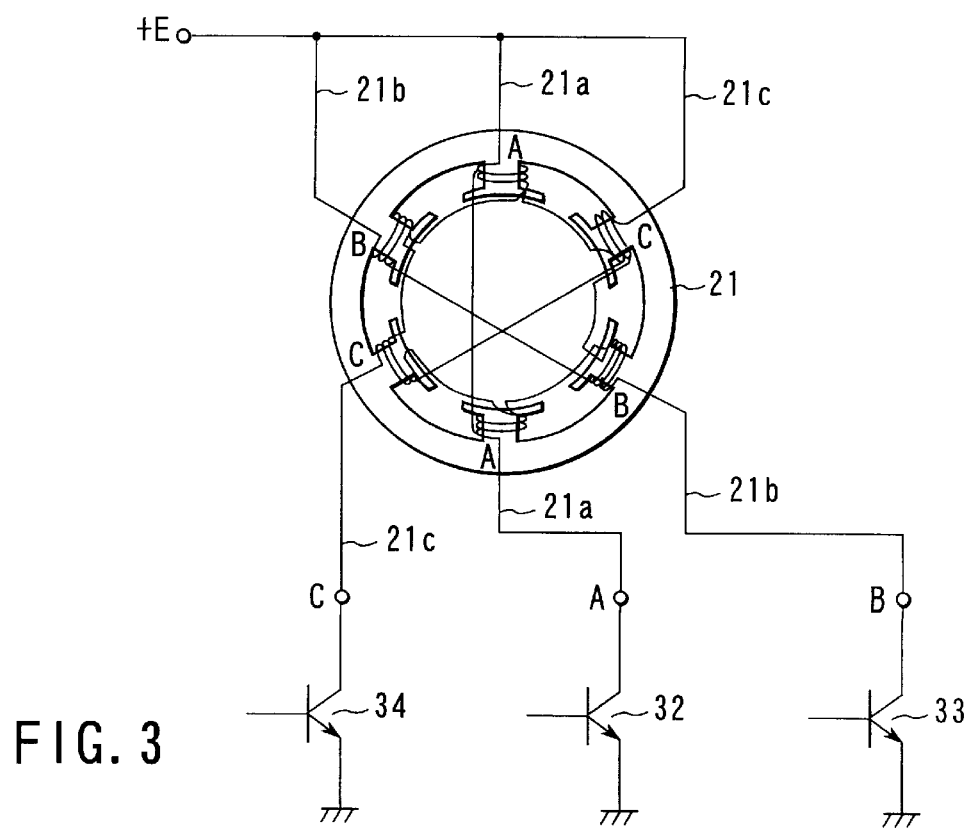
FIG. 3 is a diagram for explaining core windings of respective magnetic poles of the stator according to the first embodiment.

As for core wire winding on each magnetic pole of the stator 21, as shown in FIG. 3, core wire is wound on a main magnetic pole of each phase and a magnetic pole adjacent thereto so that the adjacent magnetic pole has a different magnetic polarity with respect to the main magnetic pole.

Figures 4A, 4B:
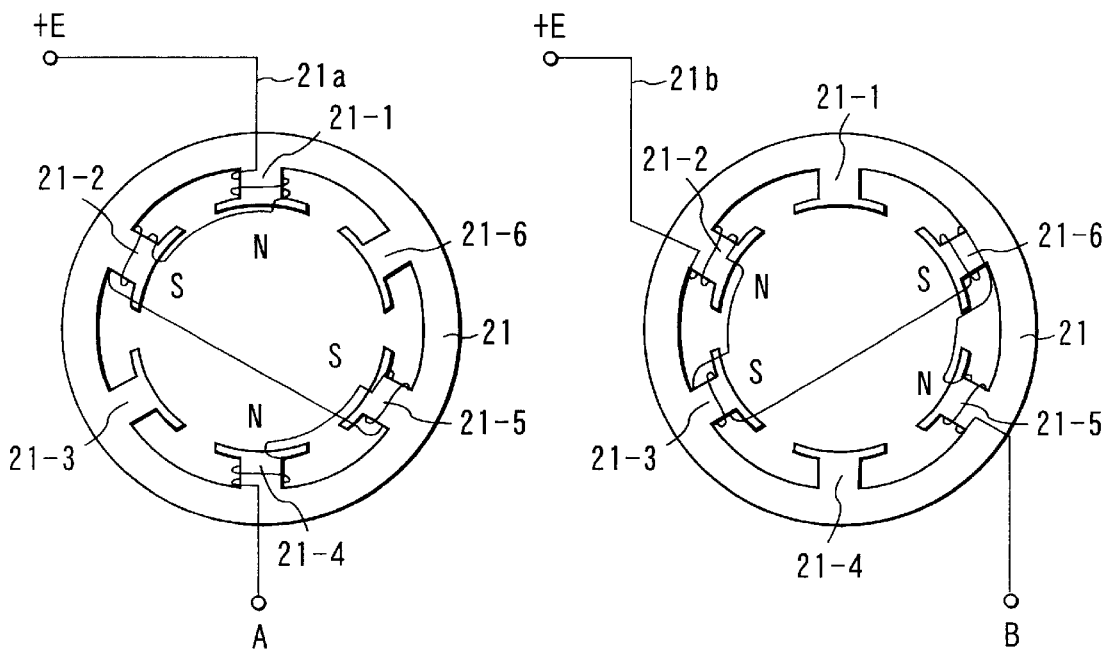
FIG. 4A, 4B, 4C are diagrams for explaining the core windings of FIG. 3 separately about each of the phases.

That is, a core wire 21a of phase A is wound around a first pole 21-1 which is a main magnetic pole counterclockwise as viewed from the rotor side as shown in FIG. 4A so as to make the pole N pole. Subsequently, the core wire is wound around a second pole 21-2 adjacent thereto at the left side clockwise so as to make the pole S pole. Further, the core wire is wound around a fifth pole 21-5 opposing the second pole clockwise as viewed from the rotor side so as to make the pole S pole. Then, the core wire is wound around a fourth pole 21-4 which is a main magnetic pole adjacent at the right side counterclockwise so as to make the pole N pole. Then, an end of this core wire 21a is connected to +E power supply terminal and the other end is grounded via a first transistor 32 as a switching device.

As for a core wire 21b of phase B, as shown in FIG. 4B, the core wire is wound around a second pole 21-2 which is a main magnetic pole counterclockwise as viewed from the rotor side so as to make the pole N pole and subsequently, the core wire is wound around a third pole 21-3 adjacent thereto at the left side clockwise so as to make the pole S pole. Further, the core wire is wound around a sixth pole 21-6 opposing the third pole clockwise as viewed from the rotor side so as to make the pole S pole and then the core wire is wound around a fourth pole 21-5 which is a main magnetic pole counterclockwise so as to make the pole N pole. Then, an end of this core wire 21b is connected to the +E power supply terminal and the other end thereof is grounded via a second transistor 33 as a switching device.

Figure 4C:
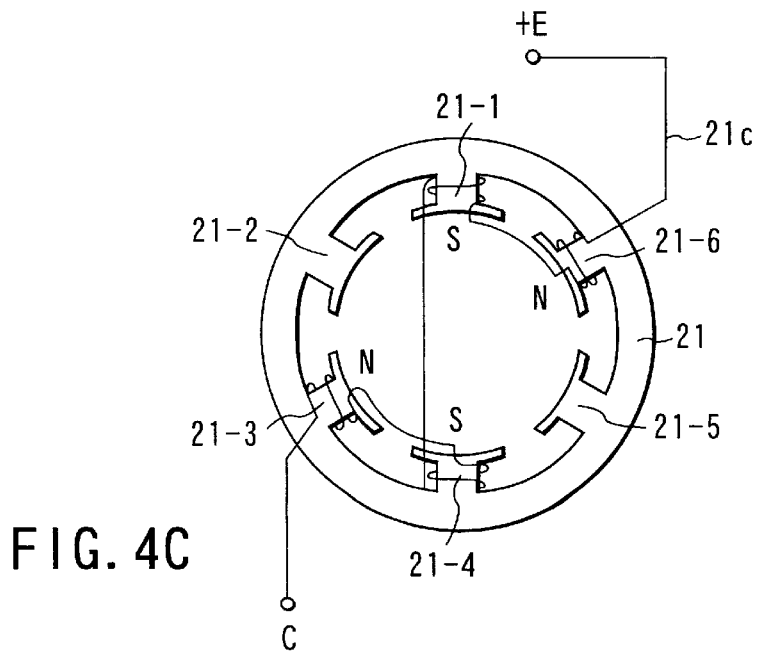

As for a core wire 21c of phase C, as shown in FIG. 4C, the core wire is wound around a third pole 21-3 which is a main magnetic pole counterclockwise as viewed from the rotor side so as to make the pole N pole and subsequently, the core wire is wound around a fourth pole 21-4 adjacent thereto at the left side clockwise so as to make the pole S pole. Further, the core wire is wound around the first pole 21-1 opposing the fourth pole clockwise as viewed from the rotor side so as to make the pole S pole and then the core wire is wound around a sixth pole 21-6 which is a main magnetic pole adjacent at the right side counterclockwise so as to make the pole N pole. Then, an end of this core wire 21c is connected to the +E power supply terminal and the other end thereof is grounded via a third transistor 34 which is a switching device.

In the above winding manner, the core wires 21a, 21b, 21c of phases A, B, C are wound around the respective poles 21-1 to 21-6 so that core wires for two phases are wound around each of the magnetic poles integrally, as shown in FIG. 3.

By controlling ON/OFF selectively of the transistors 32, 33, 34 of the respective phases in succession according to an excitation sequence shown in FIG. 15 or FIG. 16, the excitation polarity of each magnetic pole of the stator 21 is changed so as to rotate the rotor 22.

FIG. 15 is a diagram showing ON/OFF of each phase when actuating this three-phase motor. According to this diagram, when the first transistor 32 of phase A is turned ON, the other transistors 33, 34 are turned OFF. When the second transistor 33 of phase B is turned ON, the other transistors 32, 34 are turned OFF. When the third transistor 34 of phase C is turned ON, the other transistors 32, 33 are turned OFF.

FIG. 16 is a diagram showing ON/OFF of each phase for actuating this three-phase motor more in detail. According to this diagram, when the phase A is excited, the phase B to be excited next is excited overlappingly. Further, when the phase B is excited, the phase C to be excited next is excited overlappingly. Further, when the phase C is excited, the phase A to be excited next is excited overlappingly.

According to the excitation sequence shown in FIGS. 15, 16, the rotor 22 is rotated at 180° in terms of mechanical angle. By repeating this excitation sequence twice, the rotor 22 completes a single turn. If the excitation order is inverted with respect to the excitation sequence shown in FIGS. 15, 16, the rotor 22 is rotated inversely.

Figure 5A:
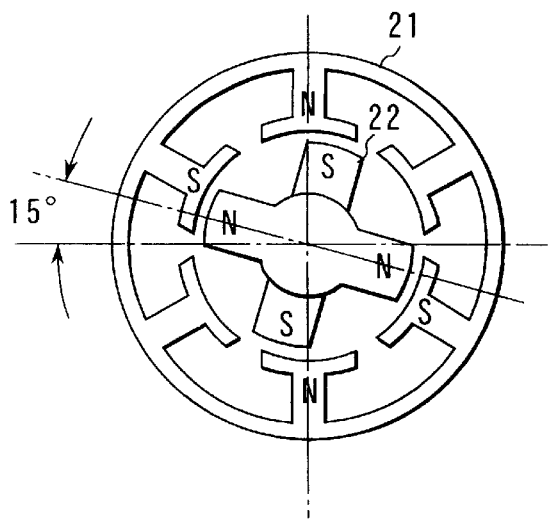
FIGS. 5A, 5B, 5C are diagrams showing a balanced state between the stator and rotor of each phase according to the first embodiment.
Figure 5B:
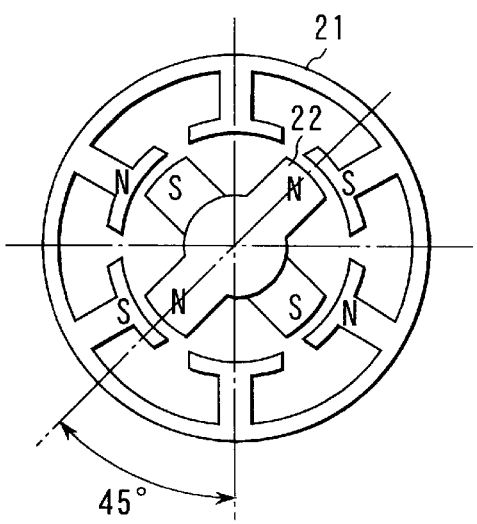
Figure 5C:
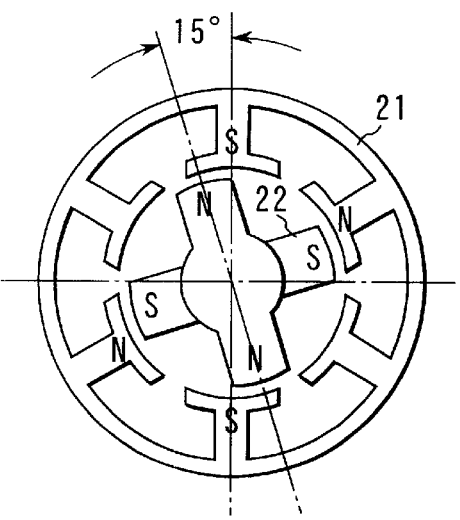

FIGS. 5A to 5C show a change of balanced positions of the stator 21 and rotor 22 in the excitation sequence of FIG. 16. FIG. 5A shows such a balanced state in which the first transistor 32 of the phase A is turned ON so as to supply power to the core wire 21a. FIG. 5B shows such a balanced state in which the second transistor 33 of phase B is turned ON so as to supply power to the core wire 21b. FIG. 5C shows such a balanced state in which the third transistor 34 of phase C is turned ON so as to supply power to the core wire 21c. The balanced position is stepped at each mechanical angle of 60° to rotate the rotor 22.

In this rotation, for example, in case of changing over from phase A to phase B, a current in the core wire 21a of phase A continues to flow until magnetic energy accumulated in the core wire is consumed by a core wire resistance via a protective diode (not shown) of the transistor 32 connected between both the ends. A rise of a current in the core wire 21b of the phase B is delayed by a current flowing in a part of the core wire 21a of phase A disposed adjacent to the same pole.

Figure 6:
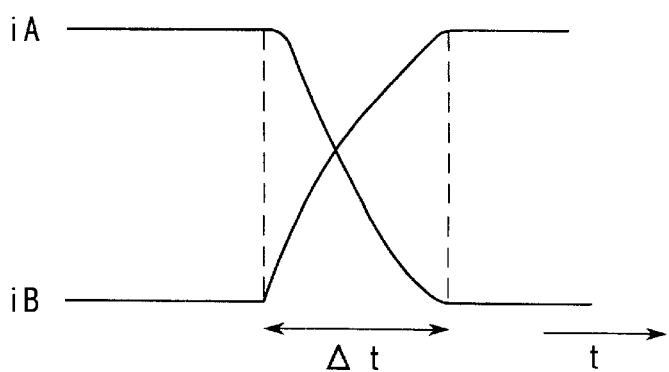
FIG. 6 is a diagram showing characteristic of a transient current flowing upon phase change-over according to the first embodiment.
Figure 7:
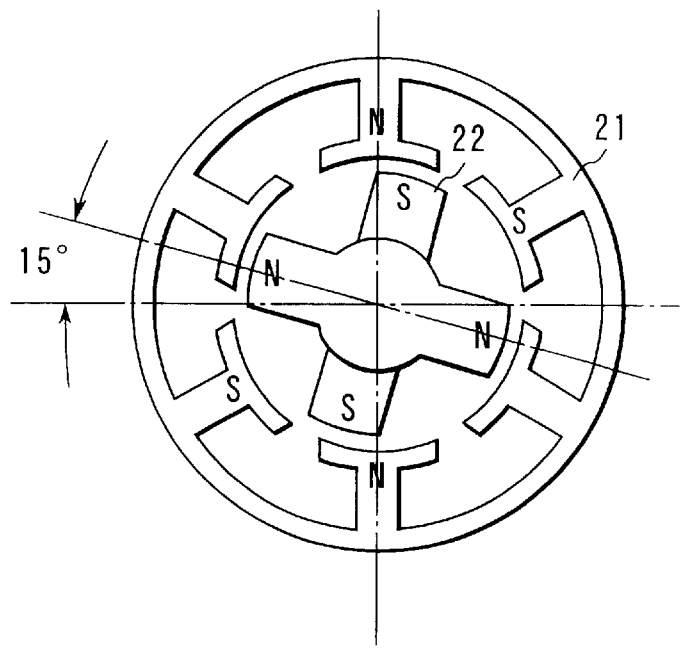
FIG. 7 is a diagram showing a distribution of magnetic poles when two phases are excited according to the first embodiment.

That is, upon changeover of the phase, a transient current characteristic shown in FIG. 6 appears so that a commutation period Δt is generated. Because in this period, a magnetic pole distribution shown in FIG. 7 is ensured, the same excitation condition as when a conventional six-step invertor is driven using six transistors is naturally provided so as to reduce a torque fluctuation.

By setting up a changeover timing for phases A, B so as to excite overlappingly as shown in FIG. 16, even use of three transistors enables to achieve a torque generation state of 30° step just like when six-step invertor is driven.

Figure 8:
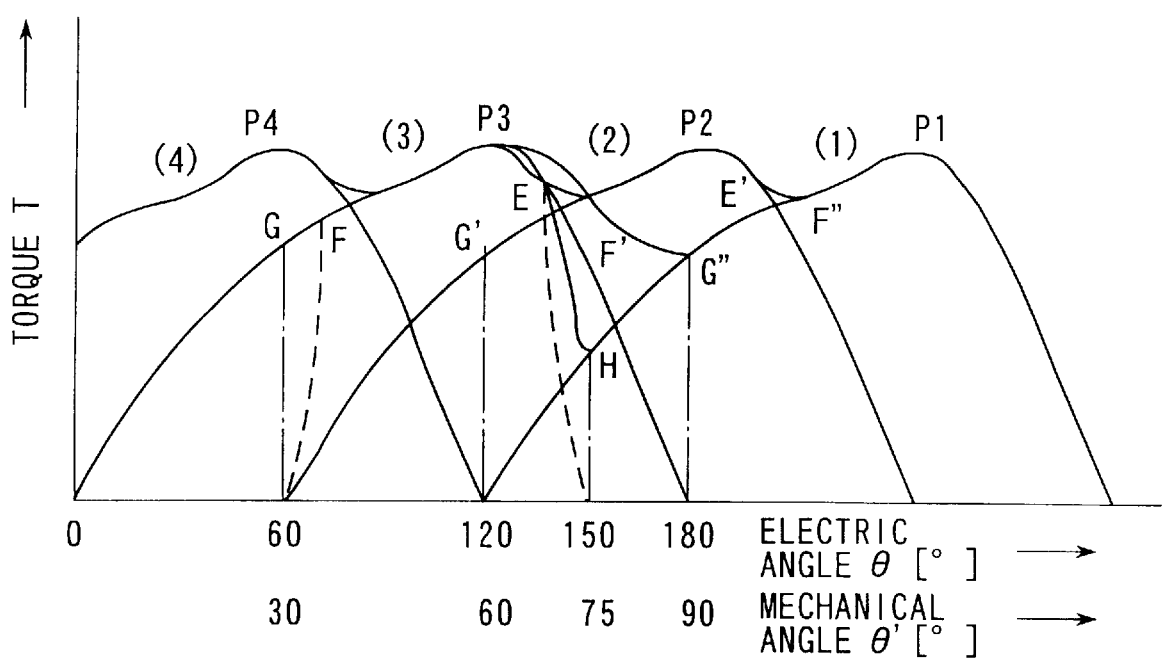
FIG. 8 is a stiffness characteristic diagram showing a relationship between a rotor deflection and a generated torque according to the first embodiment.

FIG. 8 shows stiffness characteristic of each phase for showing a relationship between a rotor deflection when respective phase core wires are excited by a predetermined current and a generated torque, in which (1) shows stiffness characteristic of phase C, (2) shows stiffness characteristic in two phases excitation state in which phases A and C are excited at the same time, (3) shows stiffness characteristic of phase A and (4) shows stiffness in two phases excitation state in which phases A and B are excited at the same time.

Figure 9A:
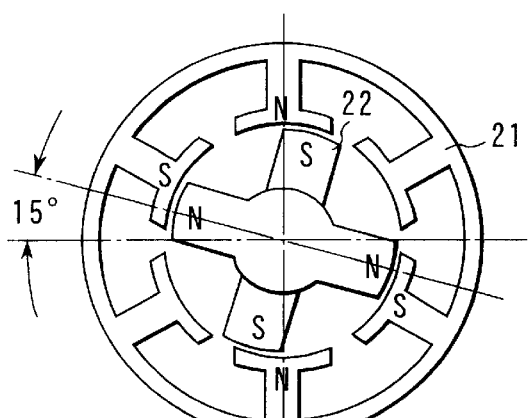
FIGS. 9A, 9B, 9C, 9D, 9E, 9F are diagrams for explaining a relationship between a magnetic pole distribution and a generated torque at a rotor balanced position and respective positions before that position according to the first embodiment.

FIG. 9A is a diagram showing phase A excitation state in which the rotor 22 is balanced, more specifically a state of zero point (0°) of stiffness characteristic of phase A in which generation torque is zero regardless of an amount of phase A current.

Figure 9B:
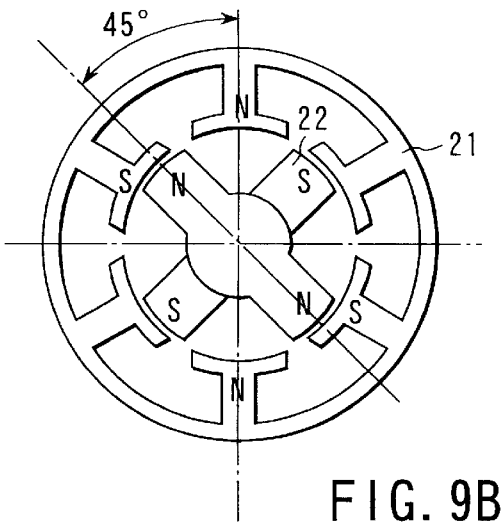

FIG. 9B is a diagram showing a state in which upon excitation of the phase A, the rotor 22 is positioned 60° in terms of electric angle forward of a phase A balanced point of the same Figure. If the phase A excitation is stopped a little before this position, generation torque of phase A decreases as shown by a descending dotted line from point F in FIG. 8.

Figure 9C:
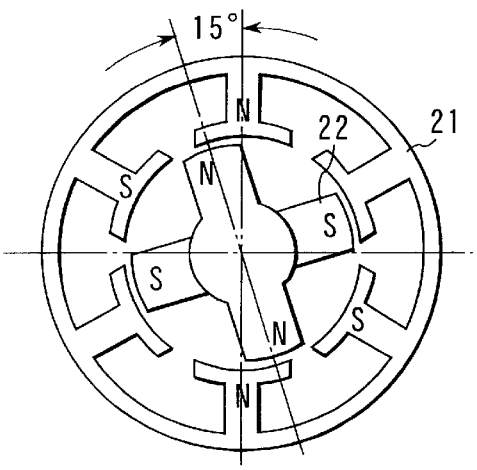

FIG. 9C is a diagram showing a state in which the rotor 22 is located 120° in terms of electric angle forward of the phase A balanced point of FIG. 9A, more specifically a state in which when the phase A is excited, the rotor 22 is located at a position near point P3 in which the generation torque is maximum.

Figure 9D:
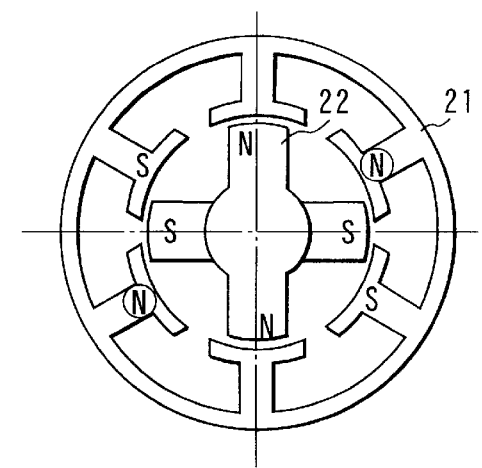

FIG. 9D is a diagram showing a state in which the rotor 22 is located 150° in terms of electric angle forward of the phase A balanced point of FIG. 9A. If the phase A is excited with the phase C excited before this position, the magnetic pole distribution of the stator 21 is ensured as shown in the Figure. Because generation torque by magnetomotive force of phase A rises up as shown by dotted line of FIG. 8, a torque synthesized with generation torque of phase C, indicated by three points H, E, P is obtained.

Figure 9E:
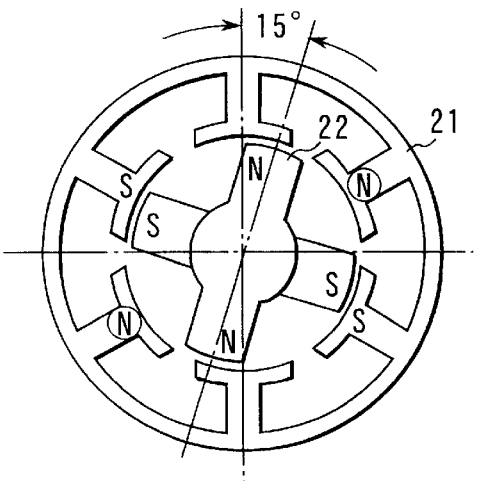

FIG. 9E is a diagram showing magnetic pole distribution in two phases excitation state in which both the phases C and A are excited when the rotor 22 is located 180° in term of electric angle forward of the phase A balanced point of FIG. 9A. A generation torque at this position is maximum torque of point P2 of FIG. 8. That is, stiffness characteristic at the time of two phases excitation of phases A and C is advanced by 60° in terms of electric angle relative to a curve (3) as indicated by a curve (2).

Figure 9F:
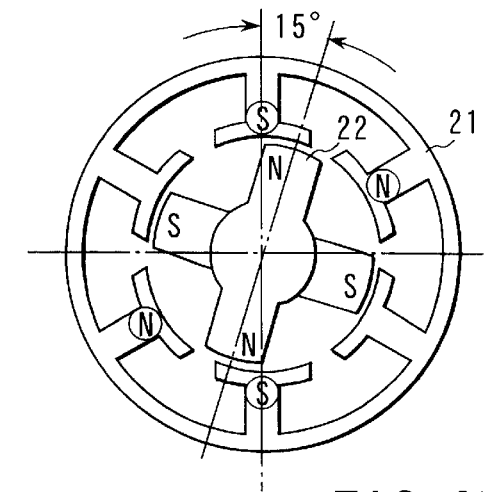

FIG. 9F is a diagram showing magnetic pole distribution when only the phase C is excited before the excitation of the phase A is started. N, S poles encircled with a circle in FIGS. 9D, 9E, 9F indicate a magnetic pole produced by exciting the C phase core wire and the others indicate magnetic poles produced by exciting the phase A core wire 21a.

FIG. 9F shows the same condition as indicated by FIG. 9B in which related positions are advanced by 120° in terms of electric angle (60° in terms of mechanical angle). Therefore, G" point torque having the same magnitude as point G of FIG. 8 is generated.

Therefore, when the rotor 22 is positioned 150°–180° in terms of electric angle forward of the phase A balanced position in an opposite direction to the rotation direction of the rotor 22, by changing the phase C excitation state to the phase A excitation state, the characteristic changes as indicated by connecting the points G" and P3 or H, E and P3. Further, if the two phases excitation state of the phases A, C is changed to single phase excitation state in which the phase A is excited, the curve (2) of FIG. 8 is changed to a curve (3) via F'-E.

If change-over between the single phase excitation and two-phase excitation is carried out appropriately in the three-phase motor, a large torque indicated by P1-F'''-E'-P2-F'-E-P3 of FIG. 8, which changes at each electric angle of 60° with a small torque deflection is obtained. If the two-phase excitation period is shortened, a torque change can be produced from the curve (1) like G"-P3 or H-E-P3.

By adjusting excitation and down timing of the three transistors 32, 33, 34 appropriately, a wide range torque change can be produced simply and further phase changeover can be achieved at a position in which torque generation efficiency is optimum. Therefore, it is possible to obtain a three-phase motor ensuring a high efficiency and suitable for high-speed driving. Because the number of transistors for use can be reduced to three, a space of circuit portion can be reduced and production cost can be reduced. Further, by setting up a period in which phases A and B, B and C, C and A are excited overlappingly upon change-over of the excitation phases, average generation torque can be increased and the torque deflection can be reduced.

Figure 10:
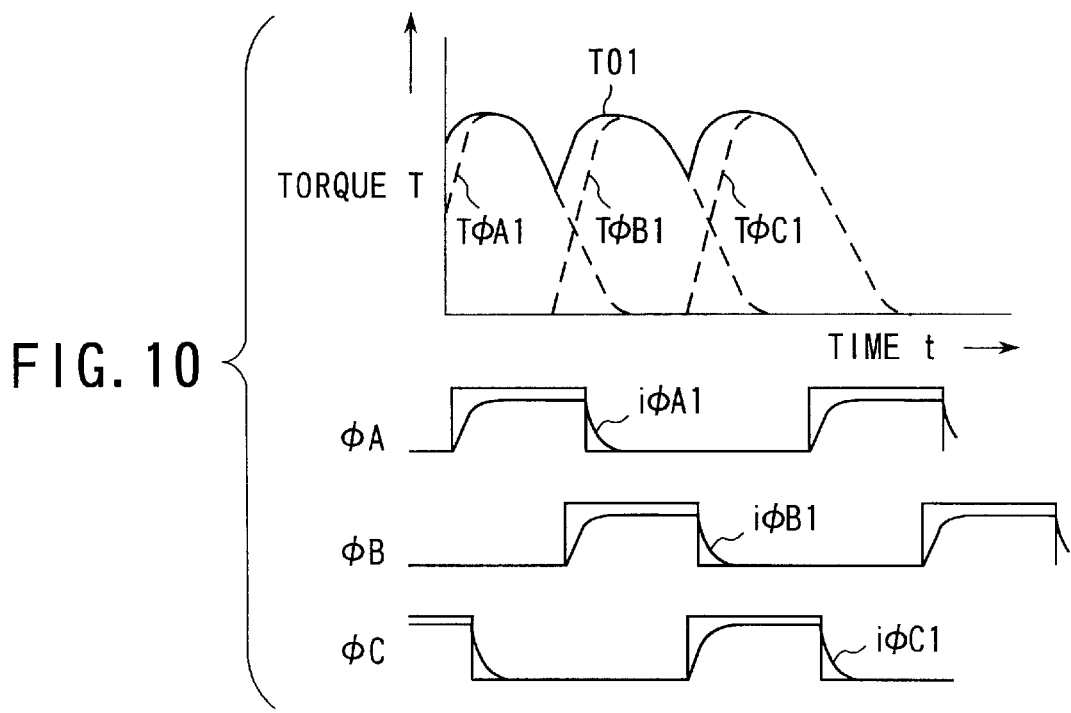
FIG. 10 is a waveform diagram showing a relationship between excitation change-over timing of each phase, generated torque and phase current according to the first embodiment.

FIG. 10 shows generation torque of each phase which changes with excitation phase change-over at timings indicated by ΦA, ΦB, ΦC with changed phase currents iΦA1, iΦB1, iΦC1, with time axis as abscissa axis. Waveforms TΦA1, TΦB1, TΦC1 dotted line of the Figure indicate torque generated when each phase is excited individually and waveform T01 of solid line in the same Figure indicates a torque generated by actual excitation.

Figure 11:
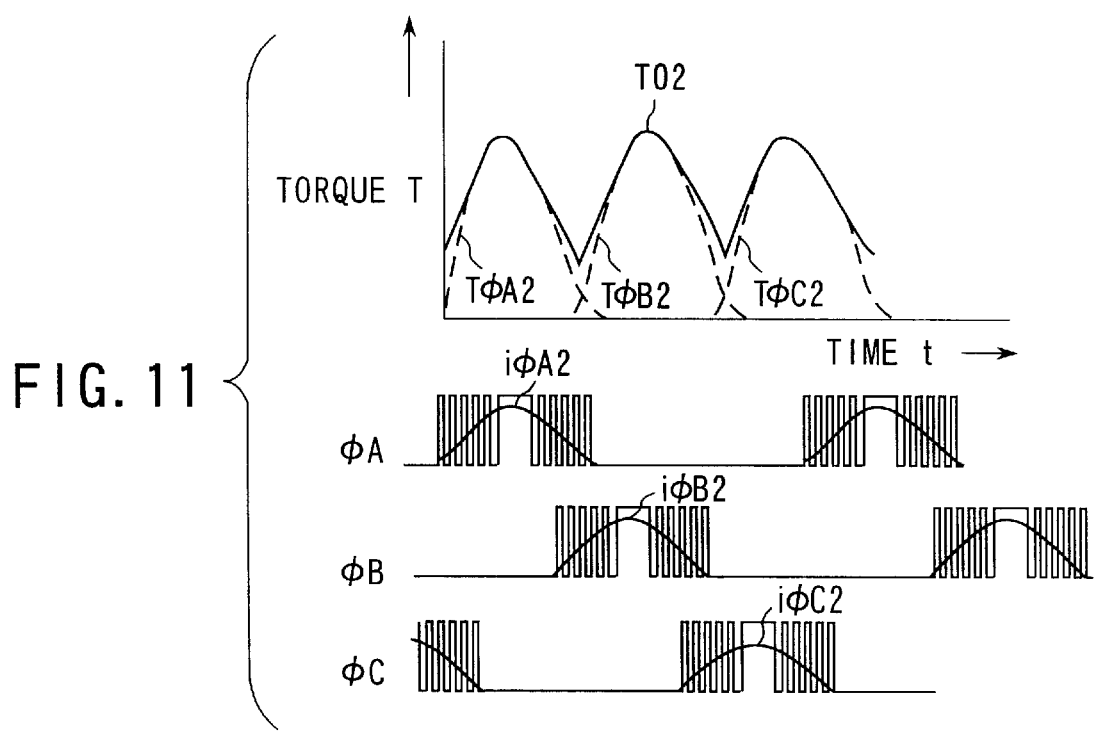
FIG. 11 is a waveform diagram showing a relationship between excitation change-over timing of each phase, generated torque and phase current when power supply to the winding is interrupted before and after an excitation period according to the first embodiment.

In FIG. 11, in the excitation period of each phase of ΦA1, ΦB, ΦC, power supply to the core wire is carried out interruptingly in a predetermined time after the start of excitation and end of the excitation. The generation torque of each phase is indicated with the changed phase currents iΦA2, iΦB2, iΦC2 with time axis as abscissa axis. Waveforms TΦA2, TΦB2, TΦC2 of dotted line of the Figure indicate a torque generated when each phase is excited individually and waveform T02 of solid line in the same Figure indicates a torque generated by actual excitation.

As described above, by interrupting a current in a predetermined time before and after the excitation period, a current when the generated torque is low can be kept low so as to increase the generated torque per unit input current. That is, although in the case of FIG. 11, current decreases by substantially half relative to the case of FIG. 10, the average torque decreases only by 10%, so that the efficiency is improved. Therefore, the efficiency can be further improved so as to realize a high-speed driving.

(Second Embodiment)

The second embodiment in which the three-phase motor is also used as the polyphase motor will be described.

Figure 12:
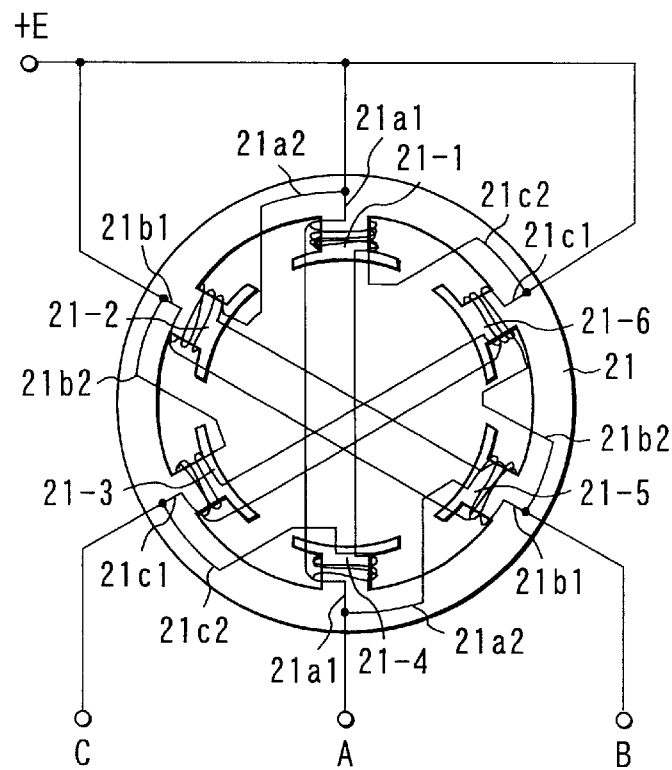
FIG. 12 is a diagram for explaining core winding of each magnetic pole of the stator according to a second embodiment of the present invention.

As shown in FIG. 12, like the first embodiment, the core wire is wound around the main magnetic pole and a magnetic pole adjacent thereto of the magnetic poles of the stator 21 so that the adjacent magnetic pole has a different magnetic pole. What is different from the first embodiment is that the core wire wound around the main magnetic pole and the core wire wound around an adjacent magnetic pole are connected in parallel.

That is, a core wire 21a1 of phase A is wound around a first pole 21-1 which is a main magnetic pole counterclockwise and the core wire is also wound around a fourth pole 21-4 opposing the first pole counter-clockwise so as to make these poles N poles. The core wire 21a2 to be connected in parallel to the core wire 21a1 is wound around a second pole 21-2 adjacent at the left side and wound around a fifth pole 21-5 opposing the second pole clockwise so as to make these poles S poles.

A core wire 21b1 to be wound around the main magnetic pole of phase B is wound around a second pole 21-2 counterclockwise and the core wire is also wound around a fifth pole 21-5 opposing the second pole clockwise so as to make these poles N poles. Further, a core wire 21b2 to be connected in parallel to the core wire 21b1 is wound around a third pole 21-3 adjacent at the left side clockwise and the core wire is wound around the sixth pole 21-6 opposing the third pole clockwise so as to make these poles S poles.

A core wire 21c1 to be wound around the main magnetic pole of phase C is wound around the third pole 21-3 counterclockwise and the core wire is also wound around the sixth pole 21-6 opposing the third pole counterclockwise so as to make these poles N poles. A core wire 21c2 to be connected in parallel to this core wire 21c1 is wound around a fourth pole 21-4 adjacent at the left side and the core wire is wound around the first pole 21-1 opposing the fourth pole clockwise so as to make these poles S poles.

By winding the core wires on the stator 21 in such a manner, currents in N pole and S pole of phase B rise independently so as to prevent the rise of current in the S pole of phase B from being delayed by a current of phase A. That is, a delay of rise of current due to core wire inductance upon commutation can be reduced thereby torque deflection being reduced. Therefore, a response to an instruction speed is improved and a faster rotation can be achieved. The other effects are the same as those of the first embodiment.

In this embodiment, core wires wound between poles opposing each other are connected in series, but core wires may be connected in parallel.

(Third Embodiment)

The third embodiment will be described about a case in which the three-phase motor is used as the polyphase motor.

Figure 13:
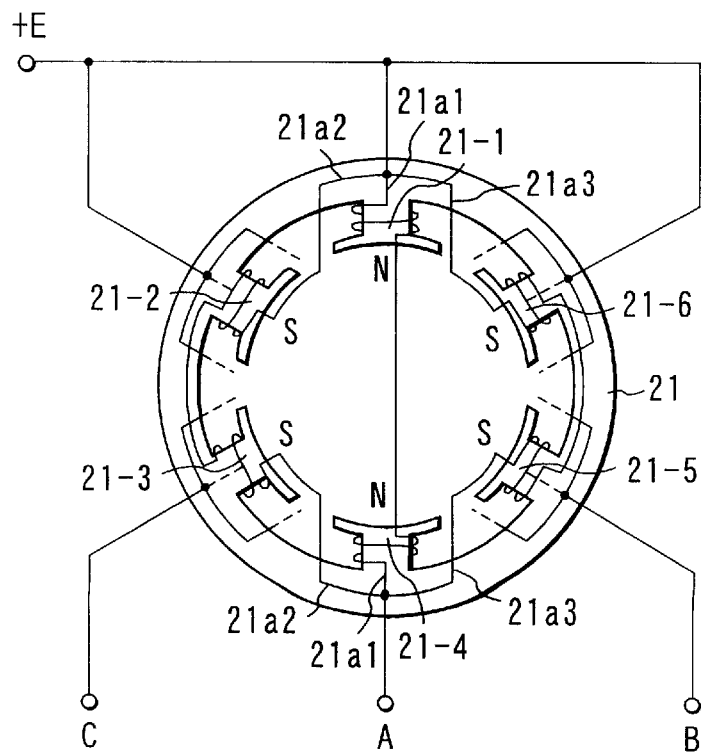
FIG. 13 is a diagram for explaining core winding of each magnetic pole of the stator according to a third embodiment of the present invention.

As shown in FIG. 13, in the stator 21, a core wire is wound around the main magnetic pole for each phase and the core wire is wound around both adjacent magnetic poles and further adjacent magnetic poles so as to make those magnetic poles having a different polarity from that of the main magnetic pole.

That is, a core wire 21a1 to be wound around the main magnetic pole of phase A is wound around a first pole 21-1 counterclockwise and the core wire is wound around a fourth pole 21-4 opposing the first pole counterclockwise so as to make these poles N poles. A core wire 21a2 to be connected in parallel to this core wire 21a1 is wound around a second pole 21-2 adjacent at the left side clockwise and further wound around the second pole 21-2 adjacent at the left side clockwise so as to make these poles S poles. A core wire 21a3 to be connected in parallel to this core wire 21a1 is wound around a sixth pole 21-6 adjacent at the right side clockwise and further wound around a fifth pole 21-5 adjacent at the right side clockwise so as to make these poles S poles.

The winding method is the same for the phases B, C.

By winding the core wires on the stator 21 in the above manner, an occurrence of a pullback torque can be prevented. In this case also, a delay of rise of current due to core wire inductance upon commutation can be reduced and torque deflection can be reduced. Further, the other effects are the same as those of the first embodiment.

(Fourth Embodiment)

The fourth embodiment will be described about a case in which the four-phase motor is used as the polyphase motor.

In FIGS. 14A to 14D, eight magnetic poles are disposed at 45° in terms of mechanical angle and a core wire is wound around each pole in concentrated bifilar winding method so as to provide a stator 211 having a 180° symmetrical structure so that phases A, B, C, D, A, B, C are formed in the counterclockwise direction. A 4-pole convex pole rotor having the same structure as the first embodiment is fixed on a rotating shaft and disposed rotatably in the stator 211.

As for core wire winding on each magnetic pole of the stator 211, like the first embodiment, core wire is wound on a main magnetic pole of each phase and a magnetic pole adjacent thereto so that the adjacent magnetic pole has a different magnetic polarity with respect to the main magnetic pole.

Figure 14A:
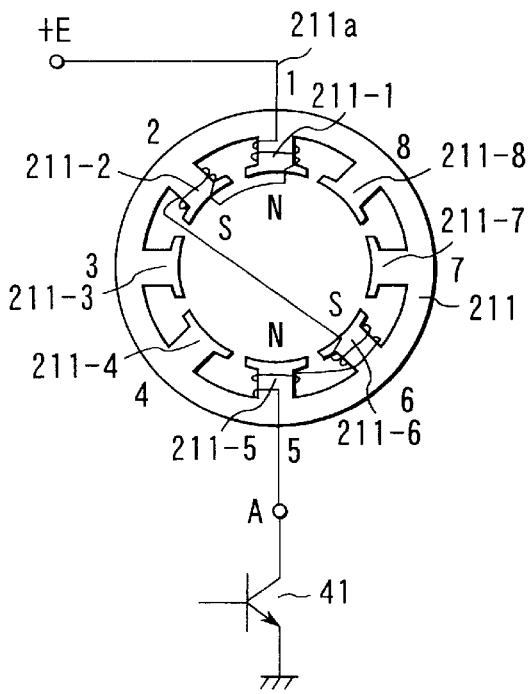
FIGS. 14A, 14B, 14C, 14D are diagrams for explaining core windings of the respective magnetic poles of the stator according to a fourth embodiment of the present invention.

That is, as shown in FIG. 14A, a core wire 211a of phase A is wound around a first pole 211-1 which is a main magnetic pole counterclockwise so as to make the pole N pole. Subsequently, the core wire is wound around a second pole 211-2 adjacent thereto at the left side clockwise so as to make the pole S pole. Further, the core wire is wound around a sixth pole 211-6 opposing the second pole clockwise so as to make the pole S pole. Then, the core wire is wound around a fifth pole 211-5 counterclockwise so as to make the pole N pole. Then, an end of this core wire 211a is connected to +E power supply terminal and the other end is grounded via a transistor 41 as a switching device.

Figure 14B:
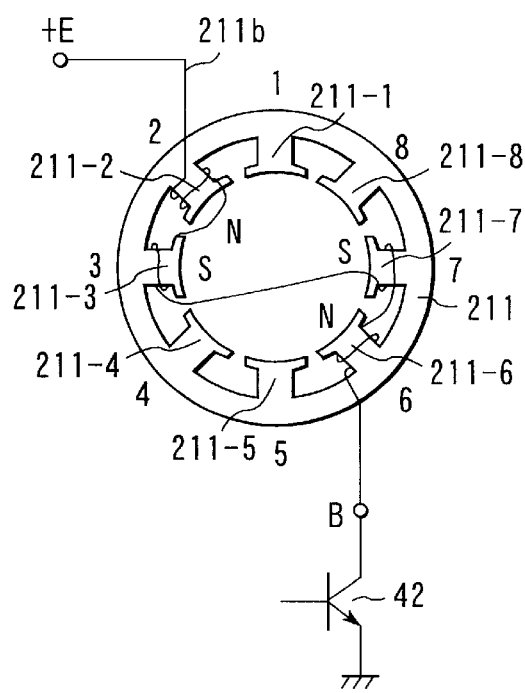

As shown in FIG. 14B, a core wire 211b of phase B is wound around a second pole 211-2 which is a main magnetic pole counterclockwise so as to make the pole N pole and subsequently, the core wire is wound around a third pole 211-3 adjacent at the left side clockwise so as to make the pole S pole. Further, the core wire is wound around a seventh pole 211-7 opposing the third pole clockwise so as to make the pole S pole and subsequently, the core wire is wound around the sixth pole 211-6 which is a main magnetic pole adjacent to the right side counterclockwise so as to make the pole N pole. An end of this core wire 211b is connected to the +E power supply terminal and the other end is grounded via a transistor 42 as a switching device.

Figure 14C:
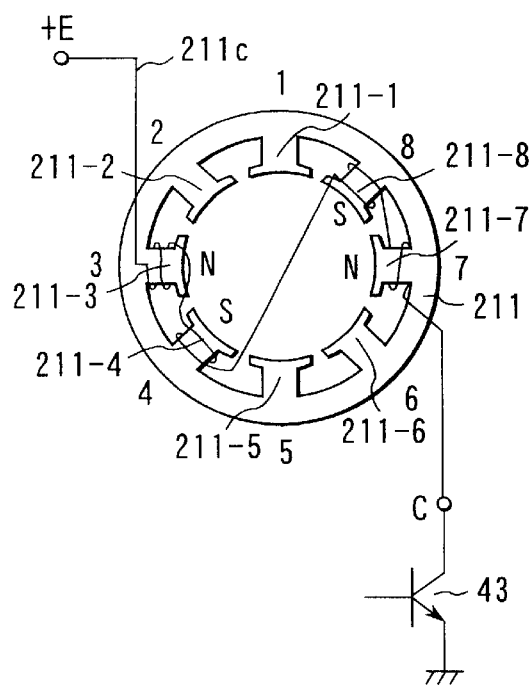

As shown in FIG. 14C, a core wire 211c of phase C is wound around a third pole 211-3 which is a main magnetic pole counterclockwise so as to make the pole N pole and then the core wire is wound around a fourth pole 211-4 adjacent at the left side clockwise so as to make the pole S pole. Further, the core wire is wound around an eighth pole 211-8 opposing the fourth pole clockwise so as to make the pole S pole and then the core wire is wound around a seventh pole which is a main magnetic pole adjacent at the right side counterclockwise so as to make the pole N pole. An end of this core wire 211c is connected to the +E power supply terminal and the other end is grounded via a transistor 43 which is a switching device.

Figure 14D:
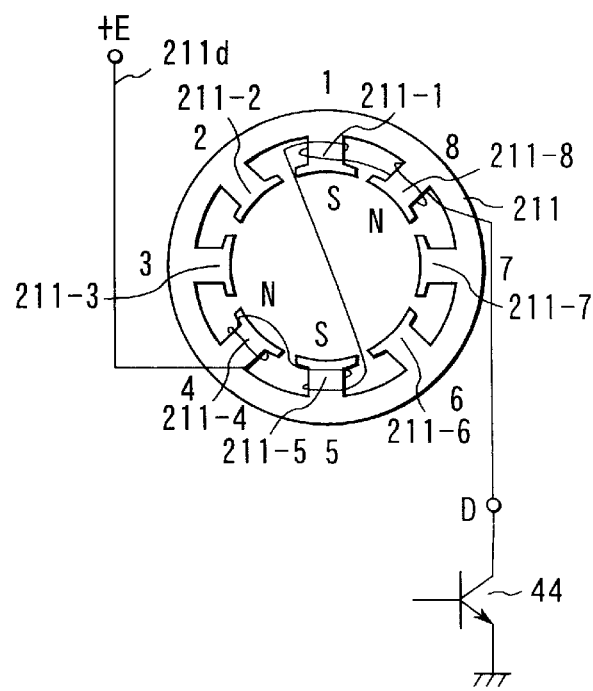

As shown in FIG. 14D, a core wire 211d of phase D is wound around a fourth pole 211-4 which is a main magnetic pole counterclockwise so as to make the pole N pole and the core wire is wound around a fifth pole 211-5 adjacent at the left side clockwise so as to make the pole S pole. The core wire is wound around the first pole 211-1 opposing the fifth pole clockwise so as to make the pole S pole and the core wire is wound around the eighth pole 211-8 which is a main magnetic pole adjacent at the right side counterclockwise so as to make the pole N pole.

An end of this core wire 211d is connected to the +E power supply terminal and the other end is grounded via a transistor 44 which is a switching device.

In the above winding manner, the core wires 211a, 211b, 211c, 211d of phases A, B, C, D are wound around the respective poles 211-1 to 211-8 so that core wires for two phases are wound around each of the magnetic poles integrally.

By controlling ON/OFF selectively of the transistors 41, 42, 43, 44 in succession according to an excitation sequence shown in a diagram of FIG. 17 showing ON/OFF of each phase upon actuating the four-phase motor, the excitation magnetic pole of each magnetic pole of the stator 211 is changed so as to rotate the rotor. In this excitation sequence, in a period when the phase A is excited, the phase B to be excited next is excited overlappingly. In a period when the phase B is excited, the phase C to be excited next is excited overlappingly. Further, in a period when the phase C is excited, the phase D to be excited next is excited overlappingly. In a period when the phase D is excited, the phase A to be excited next is excited overlappingly.

According to the excitation sequence of FIG. 17, the rotor is rotated at 180° and by repeating this sequence twice, the rotor makes a single turn. Further, if an excitation order with respect to the excitation sequence shown in FIG. 17 is inverted, the rotor can be rotated inversely.

In this four-phase motor, the number of transistors for use can be reduced to half of a conventional one, that is, four. Further, because the same excitation condition as the conventional 8-step invertor using eight transistors is naturally provided, the torque deflection can be reduced. Therefore, in the four-phase motor, the same effect as the three-phase motor can be ensured.

Although the embodiments have been described about cases in which the present invention is applied to the three-phase motor and four-phase motor, the present invention is not restricted to these examples, but it is needless to say that the present invention can be applied to a five-phase motor and other polyphase motors.

As described in detail above, according to the polyphase motor of the present invention, the number of switching devices used for controlling power supply to the core wires can be reduced to half, so that a space for the circuit portion and the production cost can be reduced.

Further, according to the second embodiment, a delay of rise of current due to core wire inductance upon commutation can be reduced so as to decrease torque fluctuation.

By exciting each phase partially overlappingly with a phase to be excited next and further increasing an average torque to be generated, the torque fluctuation can be further reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polyphase motor apparatus comprising:
   a rotor having a rotating shaft and a plurality of magnetic rotor poles; and
   a stator rotatably holding said rotor and having n phases (where n is an integer equal to or greater than 3) and n×m magnetic stator poles (where m is an integer greater than or equal to 1);
   wherein each of the magnetic stator poles is wound with a plurality of core wires for a respective plurality of different phases of the n-phases, such that during each one of the n-phases at least a first one of the magnetic stator poles has a first magnetic polarity and at least a second one of the magnetic stator poles has a second magnetic polarity different from the first magnetic polarity;

wherein when an n-phase voltage from outside is applied between a common terminal and an end of each of the core wires, successively, a plurality of different magnetic fields for the plurality of different phases are generated during one phase term of the n-phases, to thereby rotate the rotor; and wherein n is three and the stator has six magnetic stator poles divided into three pairs of adjacent magnetic stator poles which generate two different magnetic fields for two phases during one phase term of the three-phases.

2. The polyphase motor apparatus according to claim 1, wherein the plurality of core wires are directionally connected.

3. The polyphase motor apparatus according to claim 1, wherein the plurality of core wires are connected in parallel.

4. The polyphase motor apparatus according to claim 1, wherein each of the magnetic stator poles is wound with two core wires for three different phases of the n-phases, such that during each one of the n-phases at least a first one of the magnetic stator poles has a first magnetic polarity and at least others of the magnetic stator poles have a second magnetic polarity different from the first magnetic polarity; and wherein when the n-phase voltage from outside is applied between the common terminal and the end of each of the core wires, successively, three different magnetic fields for the three different phases of the n-phases are generated during one phase term of the n-phases, to thereby rotate the rotor.

5. A polyphase motor apparatus comprising:

a rotor having a rotating shaft and a plurality of magnetic rotor poles; and a stator rotatably holding said rotor and having n phases (where n is an integer equal to or greater than 3) and n×m magnetic stator poles (where m is an integer greater than or equal to 1);

wherein each of the magnetic stator poles is wound with a plurality of core wires for a respective plurality of different phases of the n-phases, such that during each one of the n-phases at least a first one of the magnetic stator poles has a first magnetic polarity and at least a second one of the magnetic stator poles has a second magnetic polarity different from the first magnetic polarity;

wherein when an n-phase voltage from outside is applied between a common terminal and an end of each of the core wires, successively, a plurality of different magnetic fields for the plurality of different phases are generated during one phase term of the n-phases, to thereby rotate the rotor; and wherein n is four and the stator has eight magnetic stator poles divided into four pairs of adjacent magnetic stator poles which generate two different magnetic fields for two phases during one phase term of the 4-phases.

* * * * *